United States Patent [19]

Eberhardt

[11] Patent Number: 4,676,065
[45] Date of Patent: Jun. 30, 1987

[54] PORTABLE ENGINE-PUMP ASSEMBLY

[75] Inventor: H. Alfred Eberhardt, Paoli, Pa.

[73] Assignee: Hale Fire Pump Company, Conshohocken, Pa.

[21] Appl. No.: 886,989

[22] Filed: Jul. 18, 1986

Related U.S. Application Data

[62] Division of Ser. No. 707,736, Mar. 4, 1985.

[51] Int. Cl.⁴ .............................................. F01N 3/04
[52] U.S. Cl. ..................................... 60/310; 181/261; 417/364
[58] Field of Search ................. 60/310; 181/260, 261; 417/364

[56] References Cited

U.S. PATENT DOCUMENTS

| | | | |
|---|---|---|---|
| 1,528,449 | 3/1925 | Meyer | 417/364 |
| 1,849,303 | 3/1932 | Labaw | 417/364 |
| 3,630,030 | 12/1971 | Wagner | 181/261 |
| 3,712,031 | 1/1973 | Cruz | 60/310 |
| 4,350,010 | 9/1982 | Yukishima | 60/310 |

Primary Examiner—Douglas Hart
Attorney, Agent, or Firm—Frank A. Follmer

[57] ABSTRACT

A portable engine-pump assembly for use in firefighting applications is constructed of a high-speed, lightweight engine and a double-suction pump. The engine is arranged with a vertical crankshaft for driving the pump which is mounted adjacent thereto with a vertical pump shaft coupled to the crankshaft. The assembly is designed to provide high lift, high efficiency and a steady high flow volume and to be compact and light in weight.

7 Claims, 11 Drawing Figures

PORTABLE ENGINE-PUMP ASSEMBLY

This is a division of copending application Ser. No. 707,736, filed on Nov. 4, 1985.

BACKGROUND AND SUMMARY OF THE INVENTION

In many applications, such as in the field of firefighting on board ships, there is a need for a portable pump which is compact and light in weight and which can produce a high lift while maintaining a steady high flow volume. It is the general object of the invention to provide a portable engine-pump assembly that achieves this result.

To this end, there is provided in accordance with the invention an engine-pump assembly comprising a high speed, lightweight engine of the two-cycle type used in outboard engines and a lightweight pump using a double-suction impeller capable of producing a high lift while maintaining a steady high flow volume. The engine is arranged with a vertical crankshaft coupled to a vertical pump shaft for driving the same. The high efficiency achieved by the engine-pump assembly of the invention is derived partly from the double suction arrangement thereby providing good ratio between the impeller eye or inlet diameter and the outer diameter of the high speed pump impeller. When using high speed engines of the indicated type, it is desirable to keep the impeller diameter to a minimum so as to keep the horsepower required to a minimum. The use of a typical centrifugal pump for the relatively high volume and high lift conditions required presents a problem in that there would be a relatively large impeller inlet diameter compared to the impeller outer diameter and consequently a very short passage through the impeller to control the flow of water resulting in an inefficient pumping action. By the use of a double-suction pump impeller in accordance with the invention it is possible to reduce the impeller diameter and still achieve a good ratio between the impeller inlet and outlet and to provide sufficient passage space for controlling the flow of water through the impeller. While double-suction pumps are known, they are usually used on industrial pumps with horizontal shafts where the flow is in a straight horizontal line between the suction and discharge of the pump. It is not obvious to use a double-suction pump with a vertical pump shaft where the inlet and outlet are in line as in the configuration of the invention to be described more fully hereafter. The double-suction pump in accordance with the invention is designed to achieve maximum efficiency on the impeller so that the pump provides good vacuum capacity or high lift capacity so that there will be a good flow volume even with the high suction lift required for shipboard use.

Another feature of the invention is the design of the assembly so that hydraulic thrust loads are practically eliminated on the pump shaft whereby the bearings of a standard commercial outboard engine are sufficient to sustain the additional load of the pump impeller. To this end, the pump is not only a double-suction impeller pump but it is also a double-discharge volute design having two cutoffs which are spaced 180° apart so as to take the radial hydraulic thrust load off the pump shaft. The design is such that any hydraulic radial thrust load built up in one volute of the pump is counterbalanced by equal thrust load on the opposite volute. Thus, with the double-suction impeller you cannot have any axial thrust load and with the double cutoff you eliminate the radial thrust load. In a centrifugal pump, the discharge cutoff is the point on the discharge body where the scroll starts for collecting the water that comes off the impeller. This pump structure actually cuts the water off the impeller and for that reason it is referred to as a "cutoff". It is noted that by eliminating all the thrust load on the pump shaft, the assembly is able to use the bearings on the engine to support the entire thrust load of the assembly.

Another feature of the invention is the novel drive coupling between the engine crankshaft and the pump impeller shaft. Briefly stated, this is achieved by the provision of an internal spline on an extension of the engine crankshaft. The pump body is then mounted on the engine body accurately by the use of piloting in a manner such that the pump impeller shaft is maintained to be concentric with the engine crankshaft, the impeller shaft being provided with an external spline which mates telescopically with the internal spline of the engine crankshaft. A unique feature of the alignment is the utilization of a bore in the engine crankcase housings for the crankshaft bearing to pilot this upper half of the pump body. Various alignment means are utilized so that the pump impeller shaft lines up accurately with the engine crankshaft so that these shafts run true and there are no thrust loads imposed upon the engine bearing by reason of the drive coupling. Accordingly, the assembly only needs to contain the thrust forces of the engine itself.

Another feature of the invention is the provision of a novel priming means for the pump. To this end, there is provided a plug means for a priming port that goes directly into the inlet passage at the highest point thereof and a primer bowl for delivering water thereto during priming.

Another feature of the invention is the provision of a novel discharge valve. The construction is such that the upper half of the pump body acts as a cover for a ball valve and the bottom half of the pump body acts as the main body of the valve. The ball valve member is dropped into place while the upper and lower halves of the pump body are separated, it being important that the pump body halves provide bearing supports that are in perfect alignment to receive the ball valve stems. Another feature of the ball valve is the arrangement providing for preloading of the ball against an O-ring seal which serves as the valve seat for the valve. The O-ring seal is provided with a steel insert and is received in a discharge fitting, which anchors to the lower housing. The O-ring seal is preloaded against the ball valve member by means of a preselected number of shims or gaskets positioned between the discharge fitting and the lower body of the pump.

Another feature of the invention is the construction of the pump body such that it achieves a plurality of functions. In accordance with the invention the lower half of the pump body contains the inlet and outlet as well as the discharge valve all in one casting with main passages being open at the top and sides. Also, the body has both the discharge and the volute as well as the double cutoff to retain radial balance on the impeller so as not to load the engine as described above. The upper half of the pump body is designed to form a one-piece mounting on the face of the engine which, in effect, becomes the mounting head for the assembly. The two pump halves are split in such a way as to give access to the critical volute passages so they may be manufactured with smooth surfaces for maximum efficiency.

Another feature of the invention is the design whereby any leakage from the seal located between the pump shaft and the pump housing is such that the leakage is open to atmosphere all around the pump shaft so that any weepage of water through the seal will not migrate up into the engine but is free to enter the atmosphere.

Another feature of the invention is the various design features which produce a very compact assembly. To this end, the engine exhaust is arranged to run directly through the upper half of the pump body and means are provided to attach a fitting to the upper half of the pump body to run the exhaust gases to a muffler. Also serving to achieve a compact structure is the arrangement whereby a plurality of functions are combined in a single element, such as the design whereby the upper half of the pump body also becomes the pump head which is normally an additional piece in a typical design. By way of example, an engine pump assembly in accordance with the invention has been designed to produce 55 horsepower in a package that is 24 by 21 inches in size and 24 inches in height.

Another feature of the invention is the provision of means for injecting water into the hot exhaust gases to cool them so they can be carried away with a rubber hose at a temperature that will not destroy the hose. To this end, a combination check valve, exhaust muffler, water trap and hose coupling is provided. The design is such that any water that would condense out in the exhaust system is kept from getting back into the engine. To this end, there is provided a ball check valve which floats in water in a water trap inside the muffler and allows the water to drain out to the atmosphere.

Another feature of the invention is the construction of light weight discharge and suction caps which are made from stampings in such a way that they provide spring clips whereby the caps can be taken off very rapidly and are held in place by the threads on the external surface of the suction and discharge pipes.

DETAILED DESCRIPTION OF THE PREFERRED EMBODIMENT

Figure 1:
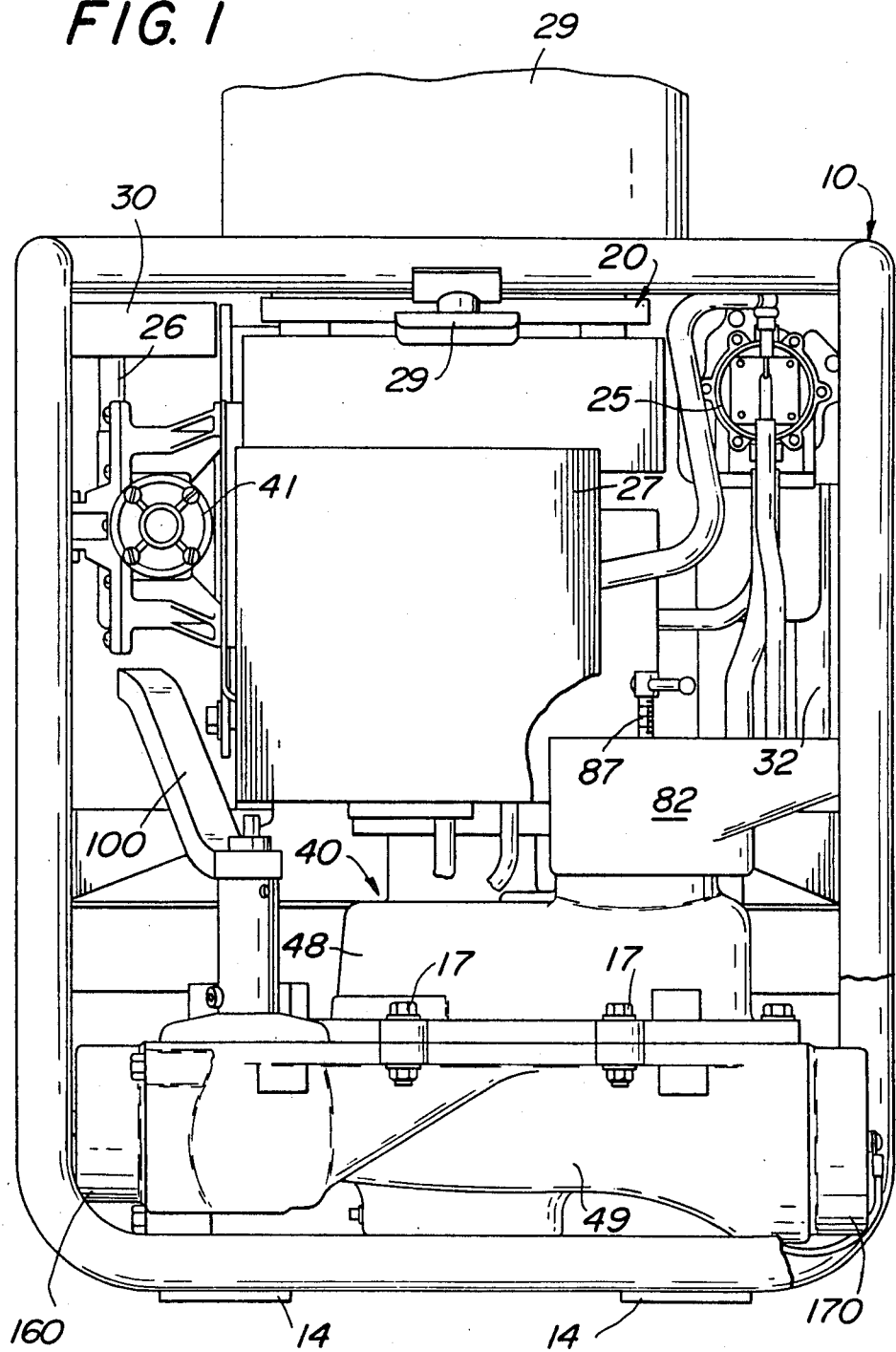
FIG. 1 is a side elevation of an engine-pump assembly in accordance with the invention.

The pump-engine assembly in accordance with the invention comprises a frame 10 including a plurality of extruded aluminum tubes having circular and square cross-sections and all welded together to form an open box-like structure as shown in the drawings. A pair of U-shaped angle members 12 extend horizontally across the bottom of the frame 10 and have a pair of plastic pads 14 bolted thereto for use in supporting the frame 10 in an upright position as shown in FIGS. 1 and 2.

An engine 20 is mounted on frame 10 by means of a shock absorbing mounting comprising a plurality of rubber bushings 22. Engine 20 is mounted on frame 10 with its crankshaft 24 extending vertically. Engine 20 is a lightweight, high speed engine of the type used as an outboard engine, such as, for example, a 55 horsepower two-cycle engine used to power boats. Engine 20 is provided with the usual conventional elements including a fuel/oil injection pump assembly 25, a shielded electrical terminal box 26, an air filter 27, a starter 28 of the recoil rope type, a fuel tank 29, an oil tank (not shown), and a throttle control 30. Engine 20 is also provided with a novel exhaust system including an exhaust muffler 32 as will be described more fully hereafter.

Figure 2:
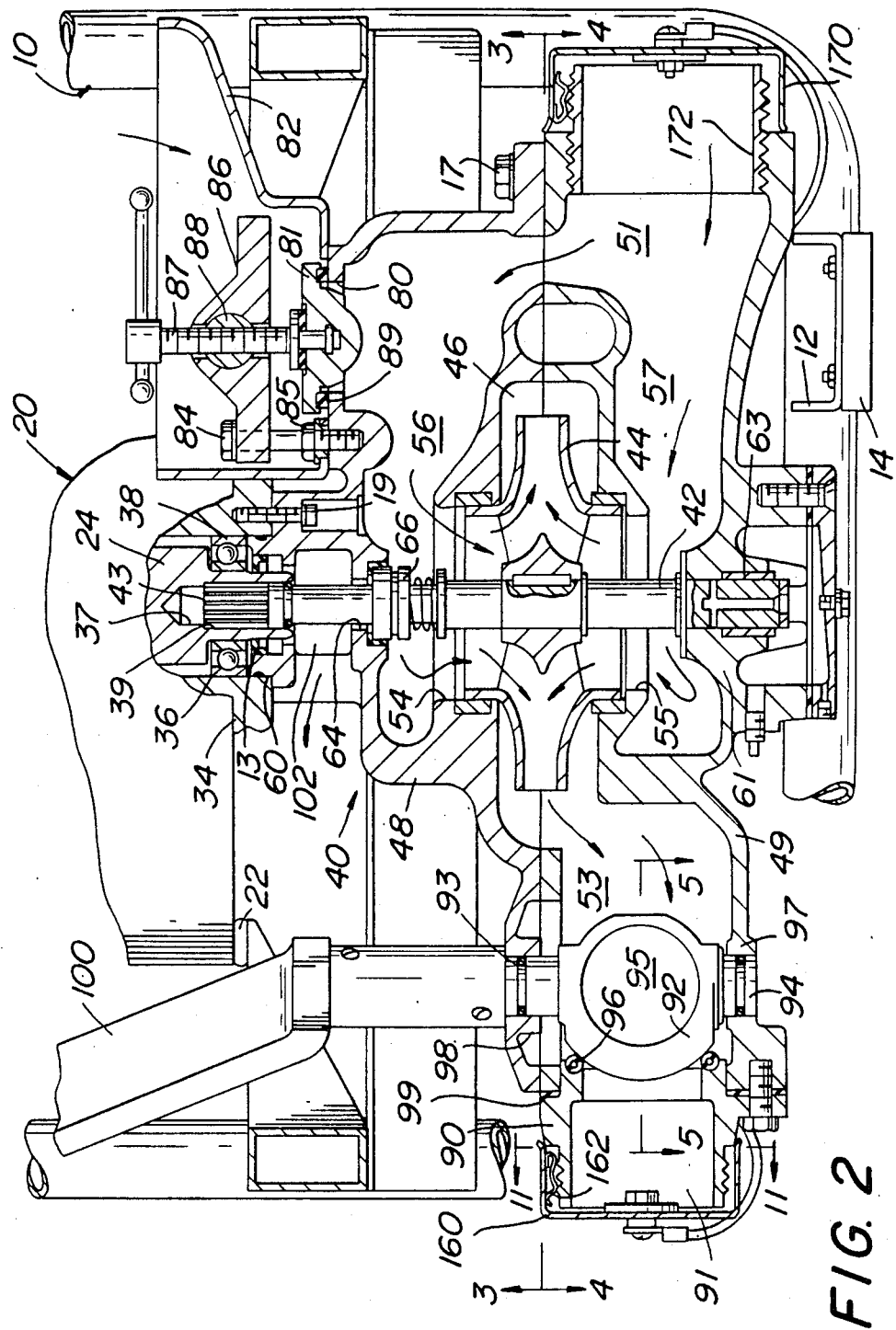
FIG. 2 is a sectional view of the lower portion of FIG. 1.

As shown in FIG. 2, the bottom end of the crankshaft 24 extends outwardly from the bottom wall 34 of the engine housing into a region enclosed by a cylindrical wall formed by a bore 36 in bottom wall 34 of the engine housing. A ball bearing 38 is mounted between the cylindrical wall of bore 36 and the crankshaft 24 for rotatably mounting crankshaft 24 to be in concentric relationship with bore 36. The bottom end of crankshaft 24 has an axial bore 37 formed therein provided with a female spline 39 for a purpose to be described more fully hereafter.

A centrifugal pump 40 is mounted within frame 10 immediately beneath engine 20 and is mounted on the underside of engine 20 by a plurality of screws 19 with its pump shaft 42 extending vertically and in alignment and concentric with engine crankshaft 24. Pump 40 is a double-suction centrifugal pump and has an impeller 44 mounted on and keyed to pump shaft 42 for rotation within a volute chamber 46. Pump 40 is provided with a priming pump 41 of the diaphragm type which is manually operated by means of a handle.

The body of pump 40 is made of an upper body portion 48 and a lower body portion 49 which cooperate to define volute chamber 46. Body portions 48 and 49 are secured together at mating faces by a plurality of bolt means 17 cooperating with flanges thereof. Lower body portion 49 provides a pump inlet passage 51 and a pump discharge passage 53 oriented in generally horizontal in-line relationship. The pump upper and lower body portions 48 and 49 also cooperate to define an inlet passage means providing a double-suction inlet to the volute chamber 46 for the flow of liquid into the impeller 44 from above and below the same as best shown in FIG. 2. The upper body portion 48 defines an upper inlet port 54 at the upper inlet to the volute chamber 46 and an upper inlet passage 56 leading from inlet 51 to upper inlet port 54. The lower body portion 49 defines a lower inlet port 55 at the bottom inlet to the volute chamber 46 and a lower passage 57 leading from inlet 51 to lower inlet port 55 as is best seen in FIG. 2 and in the detail views of the pump body, i.e., FIGS. 3 and 4. The flow through the pump passages is shown by the arrows in FIG. 2.

The pump upper body portion 48 serves as a pump mounting head for mounting the pump 40 to the engine housing with the pump shaft 42 extending vertically in alignment and concencentric with the engine crankshaft 24. To this end, upper body portion 48 has a cylindrical wall portion 60 extending upwardly from the top wall thereof within cylindrical bore 36 on the engine housing to be in fitting contact therewith for positioning the pump upper body portion 48 in alignment with the engine housing.

There are provided means for supporting the pump shaft 42 in upper and lower body portions 48 and 49 to extend vertically and with its upper end extending within the cylindrical wall portion 60. To this end, the bottom end of pump shaft 42 is mounted in a bearing support 61 formed in the lower body portion 49 and is rotatable within a sleeve bearing 63 as shown in FIG. 2. The upper end of pump shaft 42 extends through an opening 64 in the top wall of upper body portion 48 into the cylindrical wall portion 60 and into the bore 37 in the bottom end of crankshaft 24 to be coupled in alignment with crankshaft 24. The coupling means comprises a spline connection between the female spline 39 on the lower end of the crankshaft 24 and a male spline 43 formed on the upper end of the pump shaft 42. Thus, the pump shaft 42 is both piloted and driven by the engine shaft 24. The splines 39 and 43 are constructed and arranged to mate telescopically in a conventional spline coupling arrangement. An oil seal 13 is provided to seal the engine crankcase below bearing 36, seal 13 providing a seal between opposing surfaces of engine shaft 24 and the interior of cylindrical wall portion 60. A mechanical seal 66 is mounted at the upper end of the pump shaft 42 to seal the opening 64 through which the pump shaft 42 extends at the top wall of upper body portion 48.

Figure 3:
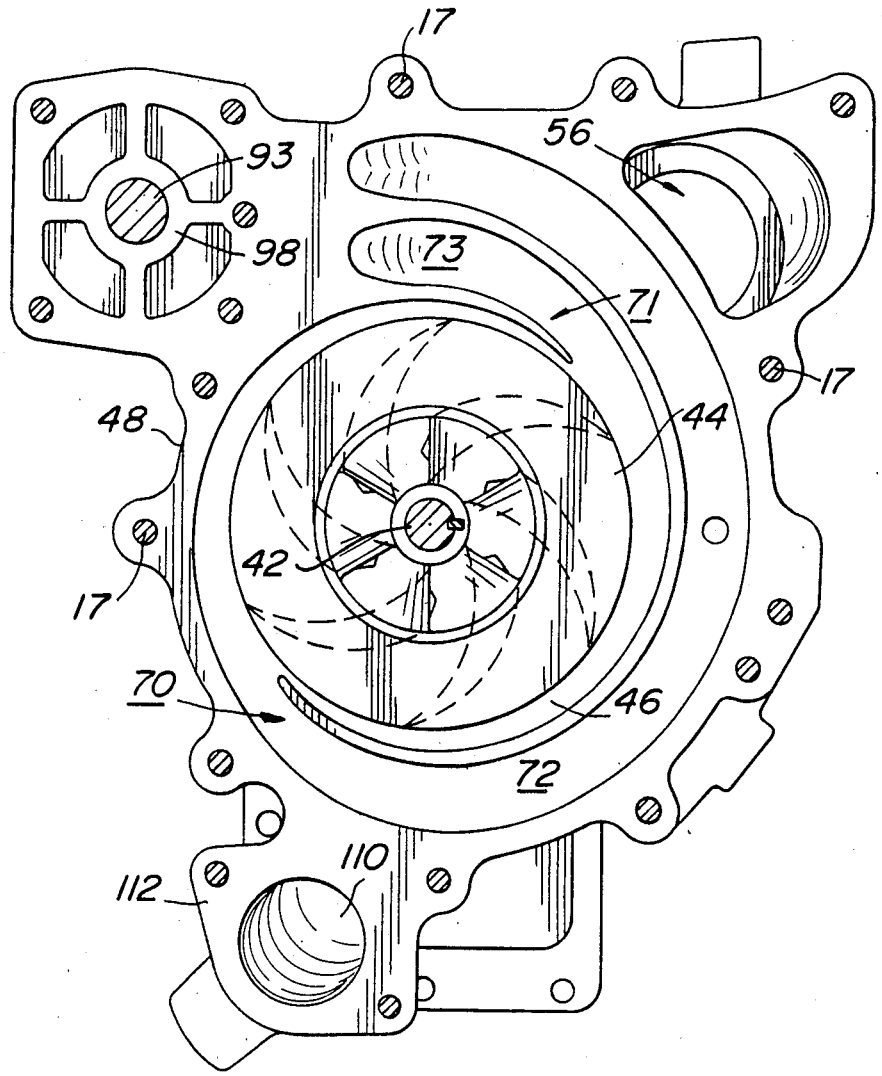
FIG. 3 is a view of the upper pump body taken generally on line 3—3 of FIG. 2.
Figure 4:
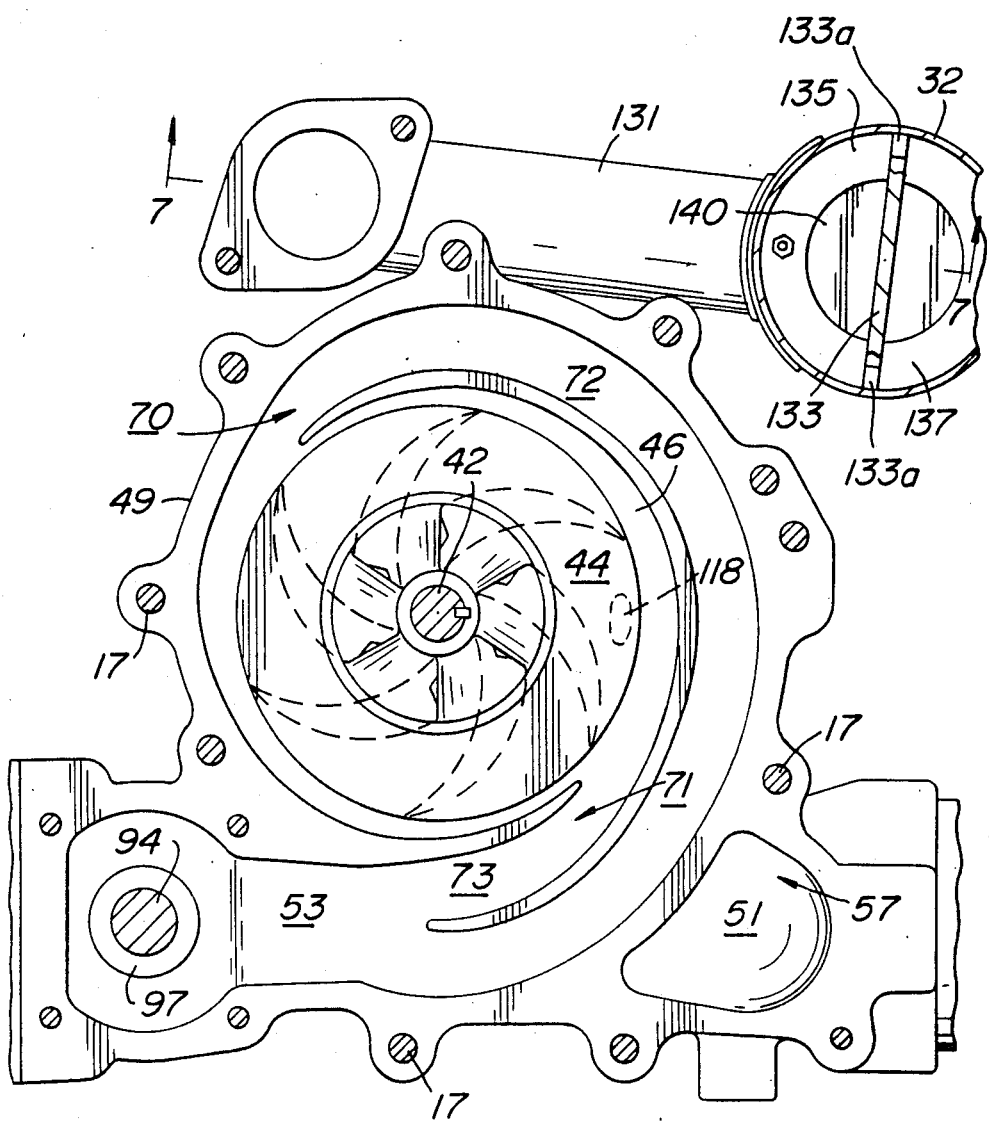
FIG. 4 is a view of the lower pump body taken generally on line 4—4 of FIG. 2.

As is best shown in FIGS. 3 and 4, the upper and lower body portions cooperate to define a pair of flow cutoffs 70 and 71 from the discharge of the impeller volute chamber 46 and also a pair of discharge (scroll) passages 72 and 73 leading from the flow cutoffs 70 and 71, respectively, to the pump discharge 53. As is shown in FIGS. 3 and 4, the flow cutoffs 70 and 71 begin at the tail end of the arrows in these figures and are located at diametrically opposite locations of the volute chamber 46. By this arrangement, radial thrust on the pump shaft 42 from the impeller discharge flow is eliminated.

In accordance with the invention, there is provided means for supplying water to the pump 40 during an additional priming method in case the priming pump 41 should fail to produce a proper prime. Such means is best shown in FIG. 2 and comprises a priming port 80 formed in the top wall of upper body portion 48 at the highest point of the upper inlet passage 56 thereof and a priming port bowl 82 mounted by means of a pair of screws 84 and nuts 85 on the upper body portion 48 to enclose the priming port 80. Bowl 82 provides a container for water to be delivered to the inlet chamber 56 during a priming operation. There is also provided a plug means for opening and closing the priming port 80, said plug means including a plug 81 mounted in a plug support arm 86 by means of a cylindrical shaped rocker lug insert 88. The plug support arm 86 is adpated to be secured onto the top of the body portion 48 by means of mounting screws 84. There is also provided an annular washer 89 extending around the priming port 80 and located between the plug 81 and the top wall of upper body portion 48 for use in sealing the priming port 80 when the plug 81 is moved downwardly by adjustment of the stem 87 in plug support arm 86 as is apparent from a consideration of FIG. 2. When it is desired to deliver liquid into inlet passage 56 for priming the pump 40, the plug 81 is raised upwardly to open the priming port 80 by adjustment of the stem 87 and liquid is poured into the bowl 82 until such time as the pump inlet passage 56 is completely filled. The plug 81 is then adjusted downwardly to close the priming port 80 and assumes a position as shown in FIG. 2.

Figure 5:
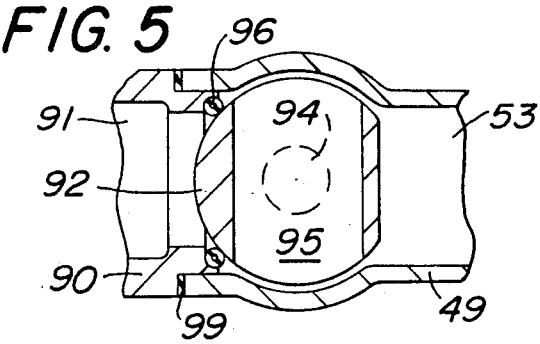
FIG. 5 is a detail view showing a discharge valve for the engine-pump assembly in a closed position.
Figure 6:
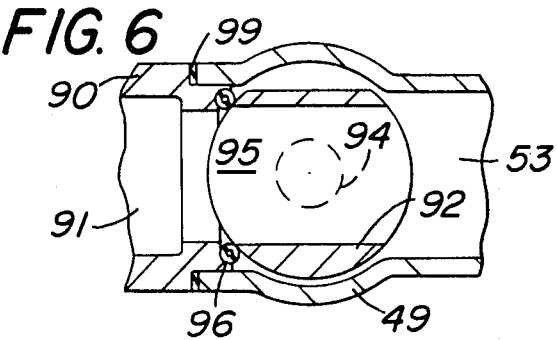
FIG. 6 is a detail view showing the discharge valve of FIG. 5 in an open position.

In accordance with the invention there is provided a novel discharge valve construction. Such means comprises a discharge fitting 90 providing a horizontally extending discharge conduit 91 in communication with the pump discharge passage 53 as shown in FIG. 2. The discharge valve comprises a ball valve for controlling flow through discharge conduit 91. The ball valve includes a ball valve member 92 having an upper stem portion 93 extending upwardly therefrom and a lower stem portion 94 extending downwardly therefrom. The ball valve member 92 provides a cylindrical flow passage 95 and has a spherical-shaped ball portion cooperating with a valve seat 96 formed on the upstream end of the discharge fitting 91. The lower body portion 49 contains the entire discharge valve and is provided with a bearing support 97 for the lower stem portion 94 arranged so that the lower stem portion 94 extends vertically. Also, the upper body portion 48 is provided with a bearing support 98 for supporting the upper stem portion 93 in a vertically extending portion. The valve seat 96 comprises a compressible O-ring with a steel insert and is arranged to enclose the discharge passage 91 and to be mounted on the upstream end of the discharge fitting 90 as shown in FIG. 2. Means are provided for preloading the O-ring against the ball member 92 by adjusting the position of the discharge fitting 90 relative thereto. The position of the fitting is adjusted by providing a different thickness of shims 99 between the opposed wall portions of the discharge fitting 91 and the lower body portion 49. These shims 99 are gaskets which also function to provide a sealing action. Ball valve member 92 is moved between the closed portion shown in FIGS. 2 and 5 and the open position shown in FIG. 6 by being turned 90° by means of a handle 100 secured to the upper stem 93.

A feature of the pump construction is the provision of a passage 102 in the upper body portion 48 between the mechanical seal 66 and the spline coupling means 39, 43 for providing flow communication between the pump shaft 42 and atmosphere. The location and construction of this discharge passage 102 is best shown in FIG. 2. By this construction any leakage of water past seal 66 from the pump 40 will go into the atmosphere and can't get into engine 20.

Figure 9:
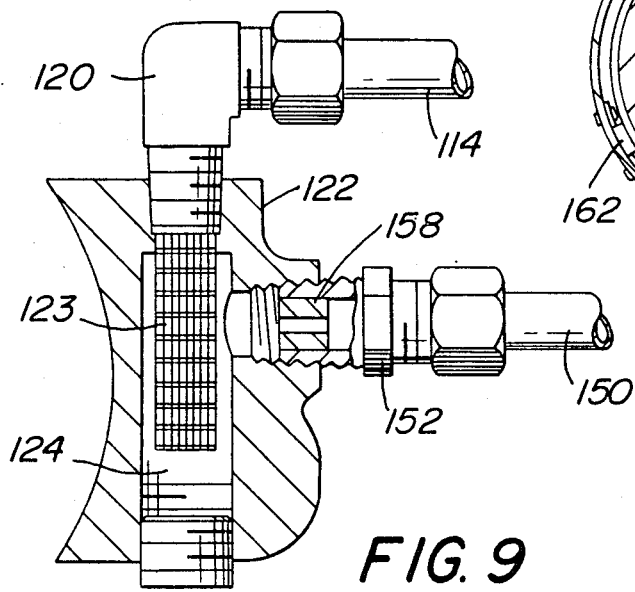
FIG. 9 is a sectional view taken generally on line 9—9 of FIG. 8.
Figure 7:
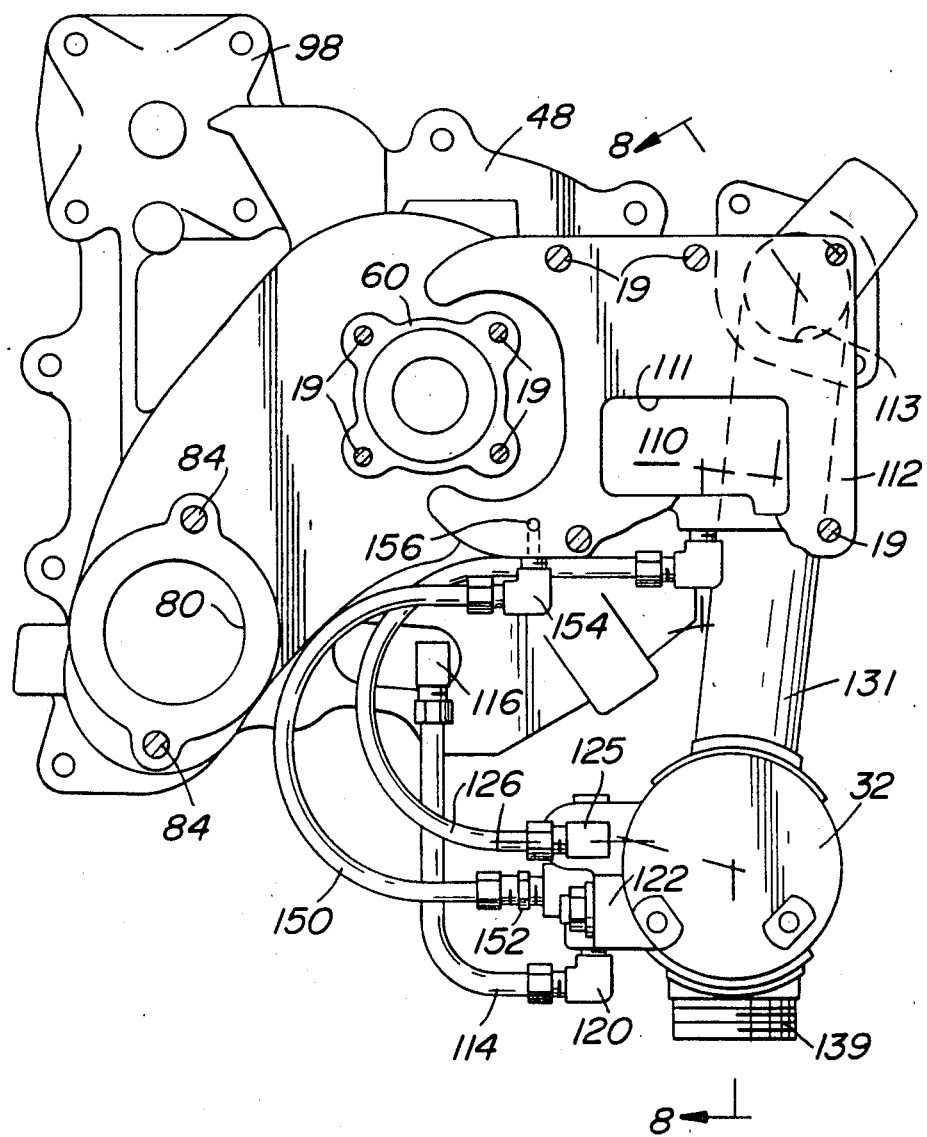
FIG. 7 is a plan view showing the exhaust system for the engine pump assembly.
Figure 8:
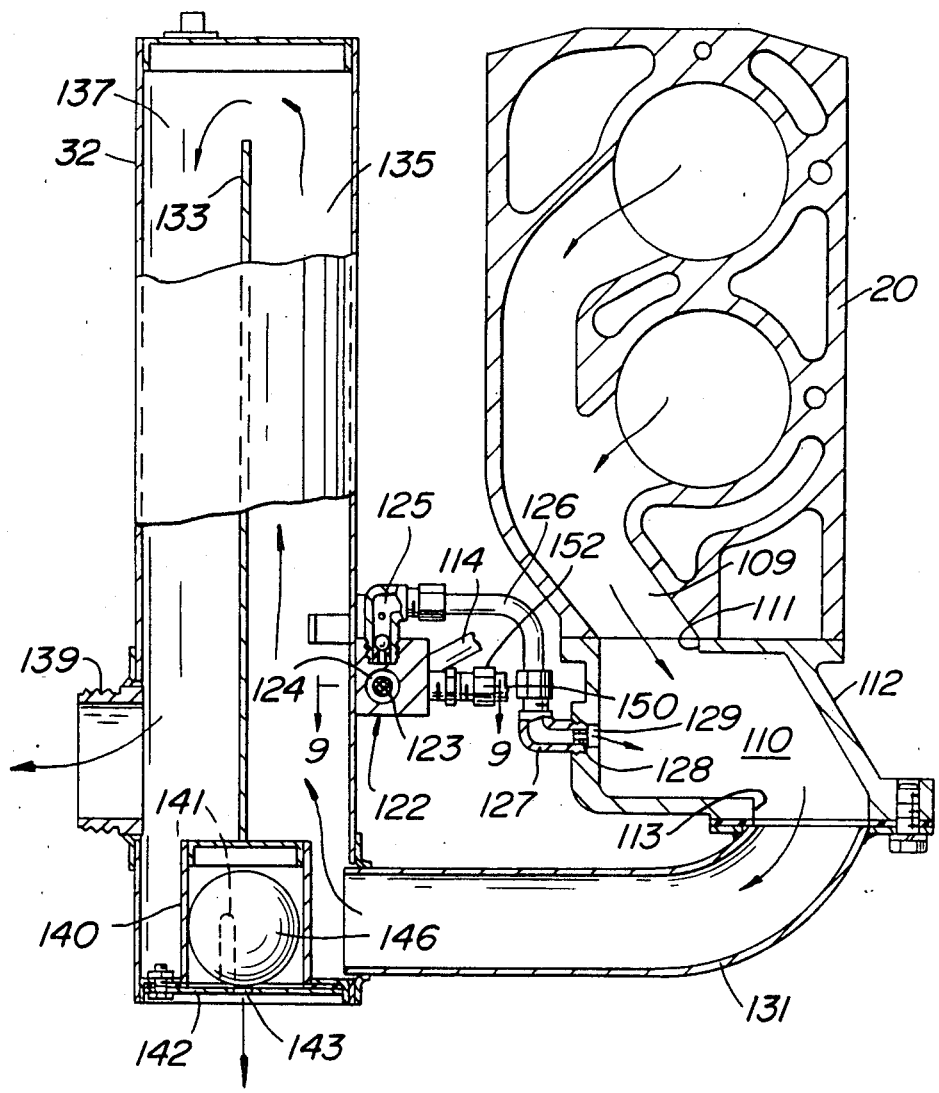
FIG. 8 is a sectional view taken generally on line 8—8 of FIG. 7.

The exhaust system of the invention is shown in detail in FIGS. 7-9 and is constructed to inject water into the engine exhaust gases for cooling the same. To this end, means are provided for delivering water from the volute chamber 46 to an exhaust passage 110 contained in an extension 112 of the upper body portion 48 of pump 40. This cooling water delivery means comprises a conduit 114 connected at its upstream end to an elbow fitting 116 which is connected to communicate with volute chamber 46 at an opening 118 (shown in FIG. 4) in the lower body portion 49 to tap water at pump discharge pressure. The downstream end of conduit 114 is connected to a strainer assembly 120 which is mounted on the side of a cooling water manifold 122 supported on muffler 32. Water is delivered at pump pressure from conduit 114 through a strainer screen 123 into a manifold chamber 124 as is best shown in FIG. 9. Water is delivered from manifold chamber 124 to exhaust passage 110 by a conduit 126 which has an exhaust spray check valve assembly 125 connected at its upstream end and an exhaust spray orifice assembly 127 connected at its downstream end. As shown in FIG. 8, check valve assembly 125 communicates with manifold chamber 124 through the top of manifold 122 and contains a ball check valve for controlling flow therethrough in the direction shown by the arrows in this Figure to thereby prevent sucking of air into the exhaust system and back into the pump during the priming thereof. Orifice assembly 127 provides flow communication from conduit 126 through an orifice member 128 and an opening 129 in the side wall of extension 112 and into exahust passage 110.

By the arrangement described above, cooling water is delivered from the pump volute chamber 46 through conduit 114, manifold chamber 124 and conduit 126 to be injected in a spray through orifice member 128 and opening 129 into passage 110.

The engine exhaust gases flow from the upper and lower cylinders of engine 20 downwardly through passage 109 into a rectangular opening 111 in the top of extension 112 and as these exhaust gases pass through passage 110 they are mixed with the cooling water spray from orifice member 128, which spray serves to cool the engine exhaust gases. From passage 110 the mixture of cooled exhaust gas and water flows downwardly through an opening 113 in the bottom of extension 112 into the upstream end of an elbow-shaped conduit 131 which communicates at its downstream end with the vertically extending muffler 32.

Muffler 32 has a vertically extending baffle 133 therein which divides the interior of muffler 32 into an upward flow passage 135 and a downward flow passage 137. The flow of the exhaust gases is shown by the arrows in FIG. 8 which shows that the gases flow upwardly through passage 135 around the upper end of the baffle 133 and downwardly through passage 137 and are discharged from the muffler 32 through an exhaust outlet fitting 139.

In use, fitting 139 has a rubber hose (often very long) connected thereto for carrying away the exhaust gases to a remote location for safe discharge. The exhaust system of the invention is provided with means for draining therefrom surplus non-evaporated water and any water that condenses in the hose from the exhaust gas stream so as to prevent this water from getting back into the engine. To this end, a cylindrical housing 140 is formed in the lower end of the muffler 32 as is shown in FIG. 8. Housing 140 is closed at its lower end by a drain cover 142 having a drain port 143 located centrally therein. A ball-shaped drain float 146 is contained within the interior of housing 140 and is adapted to cooperate with drain port 143 in the drain cover 142 to shut off flow therethrough when trap 140 is nearly empty of water. However, should any water accummulate in the bottom of muffler 32 it can flow into the interior of trap 140 through a pair of vertically extending spaced apart openings 141 in the side wall thereof. Openings 141 communicate between the bottom of flow passage 137 and the interior of housing 140. Flow passage 137 communicates with flow passage 135 by means of two openings 133a in the bottom of baffle 133 as shown in FIG. 4. When a predetermined amount of water accummulates within the interior of trap 140, the float 146 will be lifted upwardly to open the drain port 143 to allow the accummulated water to drain from the trap 140 and be discharged from the muffler 32.

Another feature of the exhaust system is that the manifold 122 is located adjacent muffler 32 so as to be in heat exchange relationship with the exhaust gases flowing therethrough. This prevents ice formation in the orifices described above.

In FIGS. 7–9 there is also shown means for delivering cooling water to the cooling passages of the engine 20. To this end, a conduit 150 is connected at its upstream end to an engine cooling orifice assembly 152 and at its downsteam end to a fitting 154 which is connected to a passage 156 in extension 112. Flow through passage 156 is communicated to the cooling passages for the engine 20 by suitable flow means (not shown). The construction of the engine cooling orifice assembly 152 is best shown in FIG. 9 which shows that this assembly 152 communicates with manifold chamber 124 through a passage which leads to an orifice defining member 158. In this manner, a controlled amount of the cooling water passes from the manifold chamber 124 through the orifice member 158 into the upstream end of the conduit 150 which then delivers the water to the engine 20 through passage 156 for cooling purposes as is conventional in the art.

The drain means for the exhaust system has several features. Float 146 is housed in cylindrical housing 140 by a construction such that float 146 is kept in place and in proximity with drain port 143 and such that housing 140 protects the float 146 from the pulsation effect of the exhaust gases entering muffler 32 from conduit 131, which pulsations could jar float 146 off its seat on drain port 143 and allow exhaust gases to escape therethrough. To this end, there is no direct communication between passage 135 and the inside of drain float housing 140 and the slots 133a in each bottom corner of baffle plate 133 provide communication between passages 135 and 137 in such a way that any surplus water condensate can drain from passage 135 into passage 137. Slots 141 provided in housing 140 allow water collecting in the bottom of chamber 137 to enter into the inside of drain float housing 140. In this manner, there is provided a "still chamber" or "quiet chamber" which eliminates the pulsations and allows the water to collect at the bottom thereof thus providing a water seal to prevent carbon monoxide from escaping through the seal seam. Also, this chamber will act more or less as a separating chamber so that only water will collect around float 146 giving a water seal seat effect and if surplus water would accummulate, the float 146 would raise up and allow the water to drain out of drain port 143. The weight and diameter of the float 146 are such that it takes a certain head above that drain port 143 to raise float 146 up thereby always providing a water seal arrangement.

Figure 10:
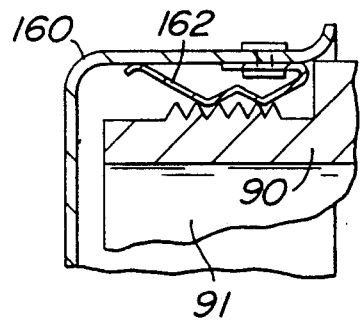
FIG. 10 is a detail view showing the discharge cap.
Figure 11:
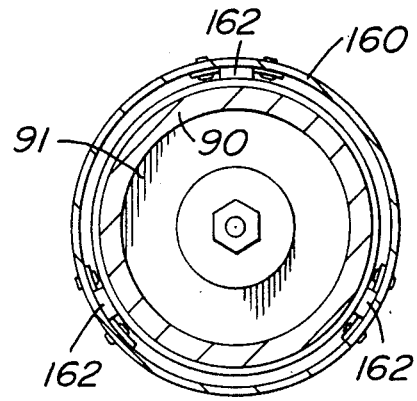
FIG. 11 is a view taken generally on line 11—11 of FIG. 2.

Another feature of the invention is a novel construction of the discharge cap 160. As shown in FIG. 2, the discharge fitting 90 is provided with external threads which, as is conventional, cooperate with a discharge hose which is threadedly secured thereon. The cap 160, which is used to enclose the discharge fitting 90 when the pump is not in use, is shown in detail in FIGS. 10 and 11 and includes three circumferentially spaced spring clips 162 secured by rivet means to the inner wall of cap 160 and adapted to engage the external threads on the discharge fitting 90. The clips 162 are flexible to allow for the spring-like engagement with said threads to maintain the same in the position as shown in FIG. 2. When the pump 40 is to be placed in operation, the cap 160 can be removed easily and quickly by grasping it and pulling it in an axial direction away from the discharge fitting 90. The construction is such that the cap 150 can be placed on an removed from the discharge fitting easily and simply.

There is also provided a suction cap 170 similar to discharge cap 160 and adapted to enclose an inlet fitting 172 mounted on pump lower body portion 49 at the pump inlet 51.

What is claimed is:

1. An exhaust system for an engine-pump assembly having an engine and a pump mounted together as an assembly, said pump having a body said exhaust system including an exhaust passage contained in the pump body, a muffler, means providing flow communication between said exhaust passage and said muffler, means for injecting water into the exhaust gas flowing through said exhaust passage, and means for draining water from said exhaust gas flow.

2. An exhaust system according to claim 1 wherein said means for injecting water into the exhaust gas includes first conduit means having its upstream end connected to receive the flow of water from said pump at pump discharge pressure and second conduit means for delivering said water at pump discharge pressure to said upper pump body passage as a spray.

3. An exhaust system according to claim 2 including a manifold connected between the downstream end of said first conduit means and the upstream end of said second conduit means and defining a manifold chamber, the upstream end of said second conduit means being connected to said manifold chamber and including a check valve means for controlling flow therethrough.

4. An exhaust system according to claim 3 wherein the downstream end of said second conduit means has an orifice means for delivering water from the downstream end of said second conduit means into said exhaust passage in the form of a spray.

5. An engine-pump assembly according to claim 3 wherein said manifold is mounted adjacent said muffler so as to be in heat exchange relationship with the exhaust gases flowing therethrough.

6. An exhaust system according to claim 3 including a strainer means mounted in said first conduit means for straining the flow of liquid therethrough.

7. An exhaust system according to claim 1 wherein said means for draining water from said exhaust gas flow comprises means defining an enclosed chamber at the bottom end of said muffler, means defining a drain port at the bottom of said chamber, float valve means within said chamber for controlling flow of water through said drain port after a predetermined volume of water has accummulated in said chamber, and passage means for communicating the interior of said chamber with the bottom end of said muffler.

* * * * *